(12) United States Patent
Reindl

(10) Patent No.: US 7,179,038 B2
(45) Date of Patent: Feb. 20, 2007

(54) FASTENER FOR APPLICATION TO A THREADED STUD

(75) Inventor: Johann Reindl, Biebertal (DE)

(73) Assignee: Newfrey LLC, Newark, DE (US)

( * ) Notice: Subject to any disclaimer, the term of this patent is extended or adjusted under 35 U.S.C. 154(b) by 114 days.

(21) Appl. No.: 10/994,210

(22) Filed: Nov. 19, 2004

(65) Prior Publication Data

US 2005/0135901 A1  Jun. 23, 2005

(30) Foreign Application Priority Data

Dec. 3, 2003  (DE) .............................. 103 57 024

(51) Int. Cl.
F16B 39/34 (2006.01)

(52) U.S. Cl. ...................... 411/433; 411/270; 411/266; 411/267; 411/437; 411/188

(58) Field of Classification Search ............... 411/433, 411/270, 266, 267, 437, 187, 188
See application file for complete search history.

(56) References Cited

U.S. PATENT DOCUMENTS

| | | | | |
|---|---|---|---|---|
| 750,675 | A * | 1/1904 | Michelin ..................... | 411/432 |
| 1,390,564 | A * | 9/1921 | Knorr .......................... | 285/243 |
| 1,475,907 | A * | 11/1923 | Volman ....................... | 411/433 |
| 2,404,169 | A | 7/1946 | Gilden | |
| 4,294,300 | A * | 10/1981 | Bouwman ................... | 411/185 |
| 4,435,111 | A * | 3/1984 | Mizusawa ................... | 411/437 |
| 4,460,298 | A * | 7/1984 | Solarz et al. ................. | 411/15 |
| 4,659,273 | A * | 4/1987 | Dudley ........................ | 411/373 |
| 4,812,095 | A * | 3/1989 | Piacenti et al. ............. | 411/188 |
| 4,850,778 | A * | 7/1989 | Clough et al. .............. | 411/433 |
| 4,890,966 | A | 1/1990 | Umezawa | |
| 4,999,019 | A * | 3/1991 | Kraus .......................... | 411/512 |
| 5,183,359 | A * | 2/1993 | Barth .......................... | 411/188 |
| 5,364,213 | A | 11/1994 | Teramura .................... | 411/431 |
| 5,711,645 | A * | 1/1998 | Sanbonmatsu et al. ..... | 411/270 |
| 5,816,762 | A * | 10/1998 | Miura et al. ................. | 411/433 |
| 5,902,085 | A * | 5/1999 | Yuta ............................ | 411/433 |
| 5,909,902 | A * | 6/1999 | Seabra ........................ | 285/322 |
| 5,944,467 | A * | 8/1999 | Yuta ............................ | 411/433 |
| 5,991,984 | A | 11/1999 | Schaty | |
| 6,155,610 | A * | 12/2000 | Godeau et al. ............. | 285/242 |
| 6,318,940 | B1 * | 11/2001 | Mitts ........................... | 411/188 |
| 6,343,904 | B1 * | 2/2002 | Wang ......................... | 411/368 |
| 6,615,459 | B2 | 9/2003 | Sano | |
| 6,729,822 | B2 | 5/2004 | Sbongk | |
| 6,796,586 | B2 * | 9/2004 | Werth ......................... | 285/243 |
| 2003/0006610 | A1 * | 1/2003 | Werth ......................... | 285/243 |
| 2003/0007846 | A1 * | 1/2003 | Sbongk ...................... | 411/433 |
| 2005/0135901 | A1 * | 6/2005 | Reindl ........................ | 411/433 |

FOREIGN PATENT DOCUMENTS

| | | |
|---|---|---|
| DE | 3503293 | 1/1985 |
| DE | 10133063 | 1/2003 |
| EP | 0717202 | 6/1996 |
| JP | 60-159485 | 8/1985 |
| JP | 4-82414 | 7/1992 |

* cited by examiner

Primary Examiner—Katherine Mitchell
(74) Attorney, Agent, or Firm—Harness, Dickey & Pierce, P.L.C.

(57) ABSTRACT

A fastener includes a sleeve-like clamping element having a cavity extending in the direction of its longitudinal axis which accommodates a threaded stud. At least one clamping region is deformable into the cavity forming at least one clamping ramp inclined toward the longitudinal axis on an outside of the clamping element. A clamping sleeve pushed onto the clamping element in an installed state grips around the clamping element. A clamping sleeve inner surface cooperates with the clamping ramp so the clamping region reaches a clamping position deformed into the cavity to hold the threaded stud. The clamping element has a forward end flange in an installation direction. Coupling elements and mating coupling elements arranged on the flange and a clamping sleeve end facing the flange interlock in the installed state, preventing rotation between the clamping sleeve and clamping element.

35 Claims, 2 Drawing Sheets

FASTENER FOR APPLICATION TO A THREADED STUD

CROSS-REFERENCE TO RELATED APPLICATIONS

This application claims the benefit of German Patent Application No. 10357024.1, filed Dec. 3, 2003. The disclosure of the above application is incorporated herein by reference.

FIELD OF THE INVENTION

The invention concerns a fastener to be applied to a threaded stud with a sleeve-like clamping element that has a cavity extending in the direction of its longitudinal axis to accommodate the threaded stud and at least one clamping region that can deform into the cavity and that forms at least one clamping ramp inclined toward the longitudinal axis on the outside of the clamping element, and with a clamping sleeve that can be pushed onto the clamping element and in the installed state grips around the clamping element, wherein an inner surface of the clamping sleeve works with the clamping ramp such that the clamping region reaches a clamping position that is deformed into the cavity and holds the threaded body, wherein the clamping element has a flange at its forward end in the direction of installation.

BACKGROUND OF THE INVENTION

Fasteners of the specified type are used particularly in automobile manufacture to fasten parts to threaded studs. The distinguishing feature of these fasteners is that they can be brought into the fastening position on a threaded stud solely through an axial motion and can be securely attached to the threaded stud by pushing on the clamping sleeve, for example by striking. The connection can be released again by unscrewing the fastener from the threaded stud like a nut. Moreover, it is possible to increase the axial clamping force of an established connection by turning the fastener in the direction of tightening.

In a fastener of the specified type known from DE 101 33 063 A1, the cross-section of the clamping element is polygonal and its wall has radially resilient wall sections that deform radially outward when the clamping element is pushed onto the threaded stud. The clamping sleeve is formed onto one end of the clamping element such that it can break off and its inner cross-section is dimensioned such that it can be pushed over the outside of the clamping element, whereby the radially resilient wall sections are deformed inward such that the threads of the threaded stud can be partially formed into the resilient wall sections. To hold the clamping sleeve in the assembled position, latching sections are formed on the flange of the clamping element that extend in the direction of the clamping sleeve and grip around a latching recess on the outside of the clamping sleeve. The outside of the clamping sleeve is hexagonal so that a wrench may be used to rotate the fastener. A torque produced at the clamping sleeve is transmitted to the polygonal wall sections of the clamping element by the polygonal inner surface of the clamping sleeve. Because of the resilience of the wall sections, this leads to an increase in the radial clamping force, thus making it more difficult to turn the fastener.

SUMMARY OF THE INVENTION

The object of the invention is to create a fastener of the aforementioned type that is characterized by ease of use.

The object is attained by the invention in that there are arranged, on the flange and on the end of the clamping sleeve facing the flange, coupling elements and mating coupling elements that interlock when the clamping sleeve is located on the clamping element in the assembled state, and that prevent rotation of the clamping sleeve relative to the clamping element.

In the fastener according to the invention, the clamping sleeve in the installed state is nonrotatably fixed to the clamping element by the coupling elements so that relatively high torques can be transmitted from the clamping sleeve to the clamping element without significantly affecting rotatability of the fastener relative to the threaded stud. This has the advantage that unscrewing of the fastener is made easier and that comparatively high tightening torques and corresponding high loosening torques can be produced and/or transmitted with the fastener in accordance with the invention.

A preferred embodiment of the invention provides that the coupling elements are composed of axial projections on the end face of the clamping sleeve and the mating coupling elements are composed of recesses in the flange of the clamping element that accommodate the projections. This simplifies manufacture of the fastener as an injection-molded plastic part and the coupling elements can be made sufficiently large without difficulty. However, the invention is not limited to such a design. Rather, projections that work in conjunction with recesses in the clamping sleeve may also be provided on the clamping element or its flange.

In accordance with another proposal of the invention, provision can be made that the initial inside diameter of the clamping element's cavity is equal to or greater than the outer diameter of the threaded stud so that the clamping element can be brought into position on the threaded stud by axial sliding and without great resistance. This refinement makes it possible to keep the assembly forces for placement of the fastener on a threaded stud especially low; this also contributes to improving the fastener's ease of use.

High retention or pull-off forces can be achieved according to another proposal of the invention in that the clamping region of the clamping element has, on its inner side that works together with the threaded stud, at least one rib that is designed to engage in a thread groove of the threaded stud. Efficacious positive locking between the clamping element and the threaded stud can be achieved by one or more ribs, which preferably are shaped to match the stud thread profile, without the need for high contact forces between the clamping region of the clamping element and the threaded stud. In addition to high pull-off forces, this design has the further advantage that no high clamping forces need be generated during assembly of the clamping sleeve, so the resistance to be overcome to move the clamping sleeve can remain correspondingly small.

According to another proposal of the invention, provision can be made that the flange of the clamping element is provided with a toothed contact surface on its forward side facing away from the clamping region. Particularly when the mating contact surface is made of a more or less resilient material, this toothing effects an increase in the frictional force between the flange and the mating contact surface that works together with the flange, which serves to increase the loosening torque, i.e. the torque required to unscrew an installed fastener. The increase in the loosening torque makes the installed fastener more secure against coming loose by itself. There is no danger here of disadvantages with respect to ease of use, however, since the design of the fastener according to the invention facilitates the transmission of high torques without an increase in clamping forces.

To secure the clamping sleeve in the installed position on the clamping element, according to another suggestion of the invention at least one flexible latching finger extending forward toward the flange can be provided, which carries at its end a catch that works in conjunction with a shoulder of the clamping element. Preferably, the shoulder is formed here by an undercut in an opening that is provided in the flange of the clamping element, and in which the latching finger engages in the installed state of the clamping sleeve. This design protects the latching point of the latching finger from external access so that the clamping sleeve cannot be separated from the clamping element once the fastener is installed. Only after the fastener has been unscrewed is the catch of the latching finger accessible on the front of the flange and can be unlocked with the aid of a tool if necessary.

According to another suggestion of the invention, the clamping sleeve can be joined to the clamping element as a single piece by means of a predetermined breaking point. Manufacture of the clamping sleeve and clamping element, for example of plastic, can thus be accomplished in a single mold, and both parts are always guaranteed to be available at installation. It is advantageous for the predetermined breaking point to be located between the rearward end of the clamping element and the forward end of the clamping sleeve in the direction of installation. At installation, after placement of the clamping element on the threaded stud, an impact in the direction of the stud axis separates the clamping sleeve from the clamping element and simultaneously moves it into the installed position. This process makes possible a short installation time and can be performed equally well by hand or with the aid of automatic assembly devices.

BRIEF DESCRIPTION OF THE DRAWINGS

The invention is explained in detail below using an example embodiment that is illustrated in the drawings. The drawings show.

DETAILED DESCRIPTION

Figure 1:
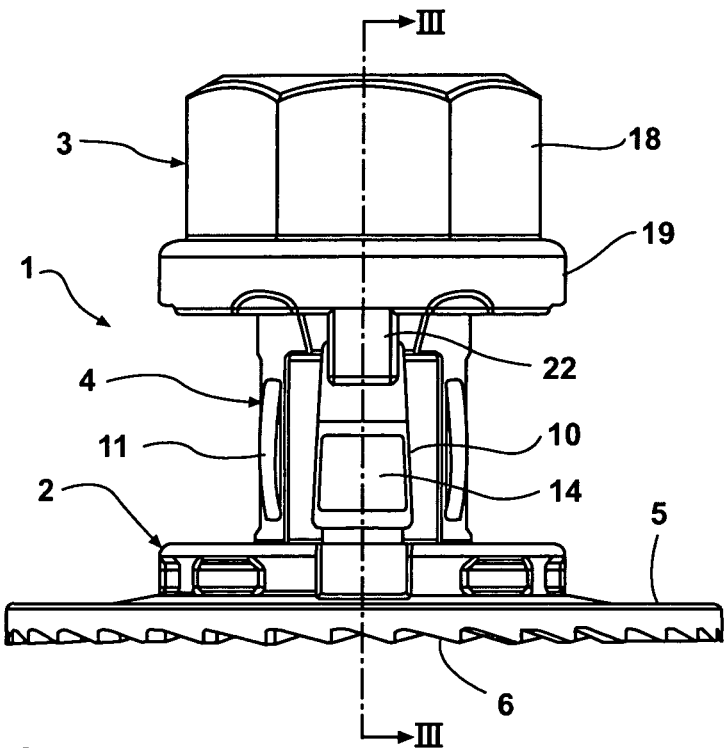
FIG. 1 is a side view of a fastener according to the invention.

The fastener 1 shown in the drawings is made of plastic in a single piece and comprises a clamping element 2 and a clamping sleeve 3. The clamping element 2 has a sleeve-shaped section 4 and a plate-shaped flange 5 located on one end of the section 4. The flange 5 has, on the outside edge of its side facing away from the section 4, saw-tooth-like toothing 6. The teeth in the toothing 6 are oriented such that, when in contact with a mating surface, they increase the resistance to rotation in the direction in which the fastener located on a threaded stud can be unscrewed.

The clamping element 2 has a cavity 7 to accommodate a threaded stud. The cavity 7 is composed essentially of a cylindrical bore that passes through the section 4 and the flange 5, wherein the center axis of the bore coincides with the longitudinal axis of the clamping element 2. The section 4 of the clamping element 2 forms a closed ring 8 at its end opposite the flange 5. Between the ring 8 and the flange 5, the wall of the section 4 is divided by longitudinal slots 9 into two opposing clamping regions 10 and two opposing connecting regions 11. Each connecting region 11 has in its center one longitudinal slot 12. The longitudinal slots 12 reduce the bending resistance of the connecting regions 11 and facilitate deformation transverse to the longitudinal extent thereof. On their outer side, the connecting regions 11 are provided with a shallow, convex arch whose apex lies in the center between the ends of the connecting regions 11.

The wall sections of the clamping regions 10 are separated from the flange 5 at their end opposite the ring 8 by recesses 13, which extend transverse to the longitudinal axis of the fastener 1. This allows the clamping region 10 to be pressed into the cavity 7 under elastic deformation inward by relatively small forces acting on it from outside. In their initial position, shown in FIG. 3, the clamping regions 10 are angled outward at approximately 10° to the longitudinal axis such that their ends adjacent to the flange 5 are a relatively great distance from one another. As a result, the outer sides of the clamping regions 10 form clamping ramps 14 that are inclined toward the longitudinal axis, and that work together with the associated inside surfaces of the clamping sleeve 3 during installation of the fastener 1. On their inside, the clamping regions 10 have saw-tooth-like ribs 15, whose shape and size are matched to the thread of a fastening stud that works in conjunction with the fastener 1. In addition, the ribs 15 of the opposing clamping regions 10 are offset longitudinally with respect to one another to match the thread pitch.

The ring 8 has an outer contour in the shape of a hexagonal prism. At its end facing away from the flange 5, the ring 8 is connected to the adjacent clamping sleeve 3 by predetermined breaking points 16 in the form of thin-walled fins. The clamping sleeve 3 has a central opening 17, which likewise has the shape of a hexagonal prism, and whose size is matched to the size of the ring 8 such that the ring 8 can enter the opening 17 without significant resistance and can be moved along the opening 17 while maintaining its orientation. On its outside, the clamping sleeve 3 has a section 18 designed as a hexagonal prism that serves for placement of a wrench. A collar 19 adjoins the section 18.

Two projections 20 are molded opposite one another on the end face of the clamping sleeve 3 that faces the clamping element 2; they have essentially the shape of roof prisms extending in the tangential direction. The projections 20 form coupling elements that work together with mating coupling elements on the flange 5. In order to form the mating coupling elements, the flange 5 has two openings 21 in a mirror image arrangement into which the projections 20 project when the clamping sleeve 3 is brought into the installed position shown in FIG. 4. The interlocking of the coupling elements and mating coupling elements produces a nonrotating connection between the clamping sleeve 3 and the clamping element 2 and permits the transmission of relatively high torques from the clamping sleeve 3 to the clamping element 2.

Provided on the collar 19 of the clamping sleeve 3 are latching fingers 22 that are each radially outside the projections 20 and extend toward the flange 5 parallel to the longitudinal axis. Located at the end of each of the latching fingers 22 on the inside is a catch 23. Openings 24 are provided in the flange 5 for the latching fingers 22. The openings 24 are provided with an undercut, which forms a shoulder 25. When the clamping sleeve 3 is brought into its installed position on the clamping element, the ends of the latching fingers 22 project into the openings 24 and the catches 23 arrive at a position wherein they grip around the shoulders 25. In this way, the clamping sleeve 3 is held in place in the installed position on the clamping element 2.

Figure 4:
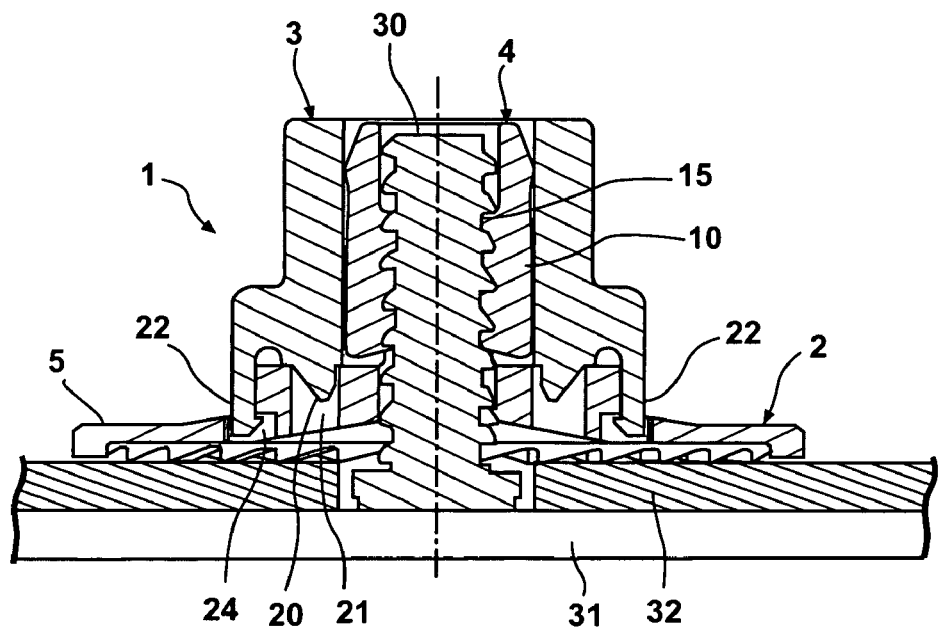
FIG. 4 is a longitudinal section of the fastener in the installed state.

FIG. 4 shows the fastener 1 in its installed position on a threaded stud 30. The threaded stud 30 is fastened to a component 31 and extends through a bore in a second component 32 resting upon the component 31, and into the fastener 1. The fastener 1 rests with the teeth 6 of the flange 5 directly on the component 32 and presses the latter against the component 31. Here, the fastener 1 is supported on the threaded stud 30 with the aid of the clamping regions 10, which engage the thread grooves of the stud thread with their ribs 15 and are held in this position by the clamping sleeve 3 pushed onto the clamping region 10.

Figure 2:
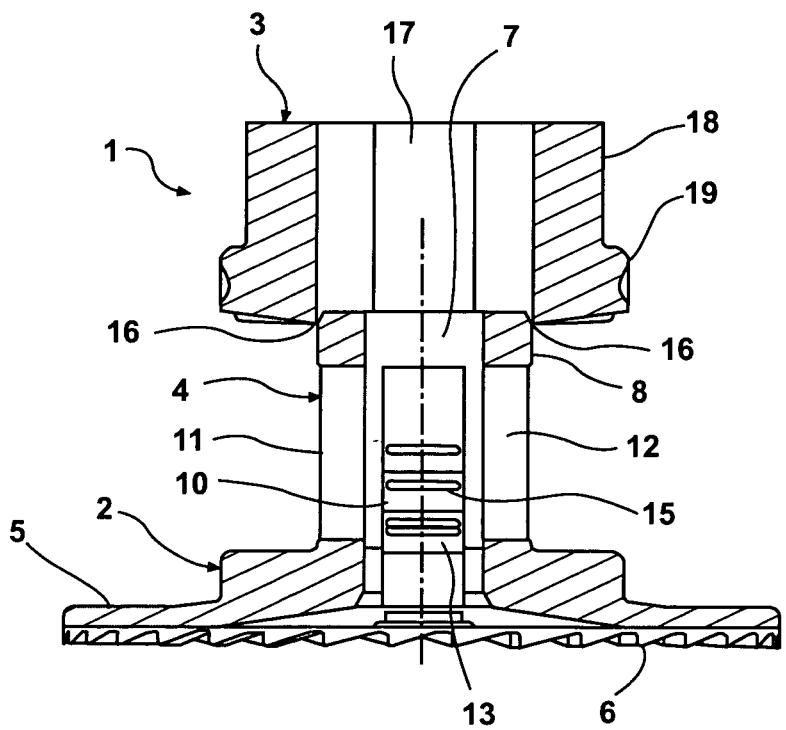
FIG. 2 is a longitudinal section through the fastener according to the invention along line II—II in FIG. 3.
Figure 3:
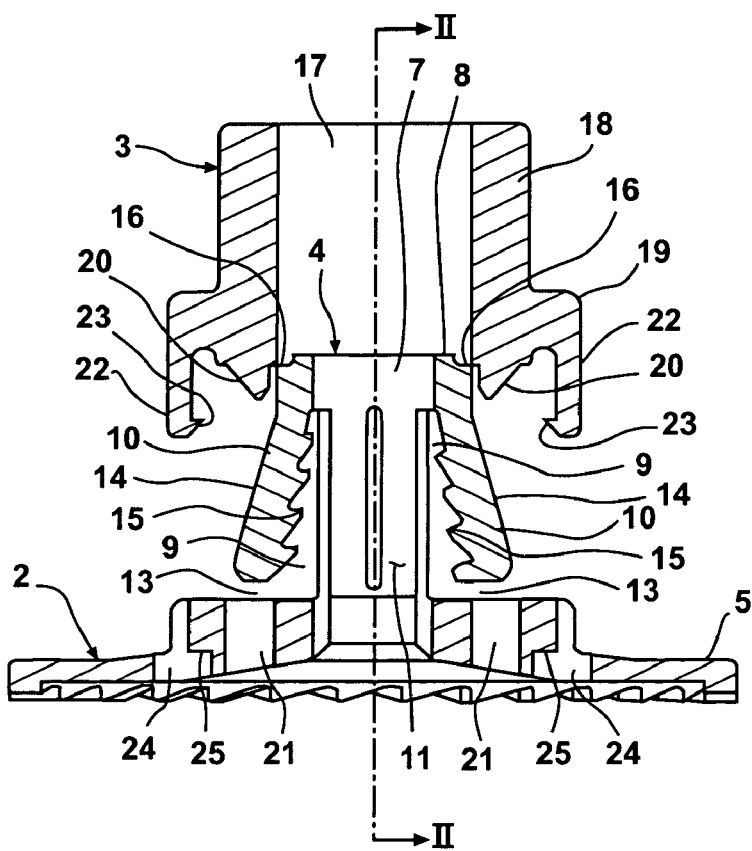
FIG. 3 is a longitudinal section through the fastener according to the invention along line III—III in FIG. 1.

The installed position of the fastener 1 shown in FIG. 4 is reached in the following way: first, the fastener 1 in the initial state shown in FIGS. 1–3 is pushed onto the threaded stud 30, which is possible without significant resistance since the cavity 7 is dimensioned large enough that neither the clamping region 10 nor the connecting region 11 need by radially deformed outward during placement on the threaded stud 30. If installation is to take place on the underside of a component, it can however be useful to dimension the distance between at least two opposing ribs 15 of the clamping regions 10 to be initially somewhat smaller than the outside diameter of the threaded stud so that the fastener 1 is held fast after being placed on the threaded stud 30. As soon as the flange 5 of the fastener 1 comes in contact with the component 32, the predetermined breaking points 16 can be broken by an axial force acting on the clamping sleeve and directed toward the component 32, for example a hammer blow, and the clamping sleeve 3 can be moved into contact with the flange 5. In this process, the clamping element 2 projects into the opening 17 of the clamping sleeve 3 and the inner surfaces of the opening 17, acting in conjunction with the clamping ramps 14, press the clamping regions 10 into the cavity 7 and firmly against the threaded stud 30 wherein the ribs 15 engage the grooves of the stud thread. Moreover, provision can be made that the center sections of the connecting regions 11 are likewise bent radially inward by the inner surfaces of the opening 17, so that they rest against the thread pitches of the stud thread without play and with preloading. In addition, the projections 20 engage the openings 21 and the latching fingers 22 project into the openings 24, while the catches 23 snap into the undercut behind the shoulders 25.

If the fastening of the component 32 is to be undone, this can only be accomplished by unscrewing the fastener 1 from the threaded stud 30. To do so, a wrench is placed on the clamping sleeve 3 and is turned in the direction of removal after overcoming the loosening torque produced by the contact of the toothing 6 with the component 32 and the thread friction. During this process, the loosening torque is transmitted from the clamping sleeve 3 to the clamping element 2 by means of the projections 20 engaging the openings 21.

What is claimed is:

1. A threaded element engagement fastener, comprising:
    a tubular clamp having first and second ends;
    a flange integrally joined to the clamp and extending radially outward from the first end of the clamp;
    a cavity created through both the clamp and the flange, the cavity extending substantially parallel to a longitudinal axis of the clamp and operable to accommodate a threaded element;
    at least one cantilevered clamping member integrally connected to the clamp at a second end of the clamp and freely extending away from the clamp toward the flange to operably create a clamping ramp angled with respect to the longitudinal axis; and
    a sleeve slidably engageable with the clamp;
    wherein in an installed position of the sleeve having the sleeve surrounding the clamping ramp, the sleeve is operable to deflect the clamping member such that the clamping member is elastically deformed into the cavity to engage the threaded element.

2. The fastener of claim 1, wherein the sleeve further comprises a projection directed toward the flange.

3. The fastener of claim 2, wherein the flange further comprises an opening operable to receive the projection of the sleeve in the installed position and prevent rotation of the sleeve relative to the flange.

4. The fastener of claim 2, wherein the sleeve further comprises a latching finger extending toward the flange, the latching finger having a catch directed toward the clamp.

5. The fastener of claim 4, wherein the flange further comprises a receiving aperture adapted to receive the latching finger, the receiving aperture further including a shoulder adapted to receive the catch of the latching finger.

6. The fastener of claim 1, wherein the at least one clamping member further comprises an opposed pair of clamping members.

7. The fastener of claim 1, wherein the at least one clamping member further comprises a plurality of ribs operable to engage a plurality of threads of the threaded element.

8. The fastener of claim 1, further comprising:
    a plurality of coupling elements disposed on one of the flange and an end of the clamping sleeve facing the flange; and
    a plurality of mating coupling elements disposed on an opposite one of the flange and the end of the clamping sleeve facing the flange having the coupling elements;
    wherein the coupling elements are operable to interlock with the mating coupling elements in the installed position to prevent rotation of the clamping sleeve relative to the clamping element.

9. The fastener of claim 1, further comprising at least one frangible element connecting the sleeve to the second end of the clamp in an initial state, the at least one frangible element being broken by an axial force acting on the sleeve operable to reposition the sleeve toward the installed position.

10. The fastener of claim 1, wherein both the clamp and the sleeve further comprise a hexagonal shape.

11. A threaded element engagement fastener, comprising:
    a tubular body having first and second ends;
    a cavity created through the body, the cavity extending substantially parallel to a longitudinal axis of the body and operable to accommodate a threaded element;
    at least one deflectable wing member integrally connected to the body at the first end of the body and freely extending away from the body toward the second end to operably create a clamping ramp angled with respect to the longitudinal axis;
    a plurality of ribs disposed on the at least one deflectable wing member and facing toward the body, the plurality of ribs operable to engage a plurality of thread grooves of the threaded element; and a sleeve frangibly connected to the body in an initial position;

wherein an axial force applied to the sleeve is operable to reposition the sleeve from the initial position into an installed position having the sleeve in contact with the clamping ramp, the sleeve being operable in the installed position to deflect the deflectable wing member such that the deflectable wing member is elastically deformed into the cavity to engage the threaded element.

12. The fastener of claim 11, further comprising a flange integrally joined to the body and extending radially outward from the second end of the body.

13. The fastener of claim 12, wherein the sleeve further comprises a projection directed toward the flange.

14. The fastener of claim 13, wherein the flange further comprises an opening operable to receive the projection of the sleeve in the installed position and prevent rotation of the sleeve relative to the flange.

15. The fastener of claim 12, wherein the sleeve further comprises a latching finger extending toward the flange, the latching finger having a catch directed toward the body.

16. The fastener of claim 15, wherein the flange further comprises a receiving aperture adapted to receive the latching finger, the receiving aperture further including a shoulder adapted to receive the catch of the latching finger.

17. The fastener of claim 12, wherein the flange further comprises:
   an outwardly directed face facing away from the sleeve; and
   a plurality of teeth disposed on the outwardly directed face.

18. The fastener of claim 11, wherein the at least one deflectable wing member further comprises an opposed pair of deflectable wing members.

19. The fastener of claim 18, wherein the body further comprises an opposed pair of clamping regions each separately positioned between the pair of deflectable wing members.

20. The fastener of claim 19, wherein the body further comprises a plurality of longitudinal slots each separating one of the deflectable wing members from one of the clamping regions.

21. A fastener assembly, comprising:
   a columnar clamping element having a cavity extending in a direction of a longitudinal axis of the clamping element and an outside, the cavity operable to accommodate a threaded fastener;
   at least one clamping region deformable into the cavity and operable to form at least one having a free end, said ramp inclined outward relative to the longitudinal axis on the outside of the clamping element;
   a clamping sleeve connectable to the clamping element in an initial position and displaceable onto the clamping element to an installed position operable t grip around the clamping element;
   an inner surface of the clamping sleeve in contact with the clamping ramp in the installed position having the clamping region reaching a clamping position with the clamping region deformed into the cavity and operable to hold the threaded fastener;
   a flange connected to the clamping element at a clamping element end facing a direction of installation of the fastener onto the threaded fastener;
   a recess created between each clamping region and the flange operable to permit deflection of the clamping region toward the clamping element; and
   a plurality of coupling elements and a plurality of mating coupling elements located on the respective flange and a respective end of the clamping sleeve facing the flange the coupling elements operable to interlock with the mating coupling elements to prevent rotation of the clamping sleeve relative to the clamping element in the installed position.

22. The fastener of claim 21, further comprising:
   at least one flexible latching finger positioned on the clamping sleeve operably extending toward the flange, the latching finger having an end; and
   a catch positioned at the end of the flexible latching finger.

23. The fastener of claim 22, wherein the flange further comprises:
   at least one opening operable to receive one of the latching fingers; and
   a shoulder created as an undercut and operable to engage the catch when the latching finger is received in the opening.

24. The fastener of claim 21, wherein the clamping sleeve in the initial position is integrally connected to the clamping element by at least one breaking point.

25. The fastener of claim 24, wherein each breaking point is connected to the clamping sleeve adjacent.

26. The fastener of claim 21, further comprising:
   a plurality of axial projections disposed on the end face of the clamping sleeve of the coupling elements; and
   a plurality of recesses in the flange of the clamping element of the mating coupling elements, the recesses operable to receive the projections.

27. The fastener of claim 21, further comprising an outer diameter of the threaded fastener, wherein an initial inside diameter of the cavity is one of equal to and greater than the outer diameter of the threaded fastener.

28. The fastener of claim 21, wherein the clamping region of the clamping element comprises, on an inner side that works together with the threaded stud, at least one rib operable to engage in a thread groove of the threaded fastener.

29. The fastener of claim 21, wherein the flange comprises, on a flange side facing away from the clamping element, a contact surface having a plurality of teeth.

30. The fastener of claim 21, further comprising:
   a polygonal-shaped outer surface of the clamping element; and
   a polygonal-shaped internal surface of the clamping sleeve operable to cooperatively mate with the polygonal-shaped outer surface of the clamping element.

31. A threaded element engagement fastener adapted for engagement of a part to an automotive vehicle mounted threaded element, the fastener comprising:
   a tubular clamp having first and second ends;
   a flange integrally joined to the clamp and extending radially outward from the first end of the clamp;
   a cavity created through both the clamp and the flange, the cavity extending substantially parallel to a longitudinal axis of the clamp and operable to accommodate a threaded element;
   at least one cantilevered clamping member integrally connected to the clamp at a second end of the clamp and freely extending away from the clamp toward the flange to operably create a clamping ramp angled with respect to the longitudinal axis;
   a sleeve including a projection directed toward the flange and at least one frangible connection joining the sleeve to the clamp in an initial position; and an opening created in the flange operable to receive the projection of the sleeve;

wherein the sleeve is displaceable from the initial position to an installed position by an axial force applied to the sleeve operable to break the frangible connection, and in the installed position having the sleeve surrounding the clamping ramp, the sleeve is operable to deflect the clamping member such that the clamping member is elastically deformed into the cavity to engage the threaded element and the projection is received within the opening to prevent rotation of the sleeve relative to the flange.

32. The fastener of claim 31, wherein the sleeve further comprises a latching finger extending toward the flange, the latching finger having a catch directed toward the clamp.

33. The fastener of claim 32, wherein the flange further comprises a receiving aperture adapted to receive the latching finger, the receiving aperture further including a shoulder adapted to receive the catch of the latching finger.

34. The fastener of claim 31, wherein the at least one clamping member further comprises an opposed pair of clamping members.

35. The fastener of claim 31, further comprising a plurality of coupling elements and a plurality of mating coupling elements located on opposite ones of the flange and on an end of the sleeve facing the flange, the coupling elements operable to interlock with the mating coupling elements to prevent rotation of the sleeve relative to the clamp in the installed position.

* * * * *

UNITED STATES PATENT AND TRADEMARK OFFICE
CERTIFICATE OF CORRECTION

PATENT NO. : 7,179,038 B2 Page 1 of 1
APPLICATION NO. : 10/994210
DATED : February 20, 2007
INVENTOR(S) : Johann Reindl It is certified that error appears in the above-identified patent and that said Letters Patent is hereby corrected as shown below:

Column 7,
Line 50, after "one" insert --clamping ramp--.
Line 55, "t" should be --to--.

Column 8,
Line 24, "connected to the clamping sleeve adjacent." should be --connected adjacent to the clamping sleeve.--.

Signed and Sealed this

Thirteenth Day of July, 2010

David J. Kappos
*Director of the United States Patent and Trademark Office*